Patented Nov. 14, 1939

2,179,999

UNITED STATES PATENT OFFICE 2,179,999

DENATURED ALCOHOL CONTAINING TETRAHYDROFURFURYL ALCOHOL

Louis J. Figg, Jr., Kingsport, Tenn., assignor to Eastman Kodak Company, Rochester, N. Y., a corporation of New Jersey No Drawing. Application October 23, 1937, Serial No. 170,658

1 Claim. (Cl. 202—77)

This invention relates to the denaturing of ethyl alcohol, and to alcohol so denatured.

It is an object of my invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

I have discovered that tetrahydrofurfuryl alcohol is an effective denaturant for alcohol. In denaturing ethyl alcohol with my novel denaturant, I may use from 0.5 to 5 parts of tetrahydrofurfuryl alcohol, or even more, per 100 parts of 95% alcohol. Tetrahydrofurfuryl alcohol may be used alone in denaturing, or it may be used in conjunction with denaturing materials derived from the destructive distillation of hardwood, such as those which are described in my United States Patents 1,975,090, 1,975,091, and 1,975,092. Likewise, it may be used in conjunction with any other denaturants with which it may be found to be compatible.

What I claim as my invention and desire to be secured by Letters Patent of the United States is:

Industrial ethyl alcohol denatured with 0.5 to 5 parts of tetrahydrofurfuryl alcohol, as an essential denaturing element, per 100 parts of 95% ethyl alcohol.

LOUIS J. FIGG, JR.